Figure 2:
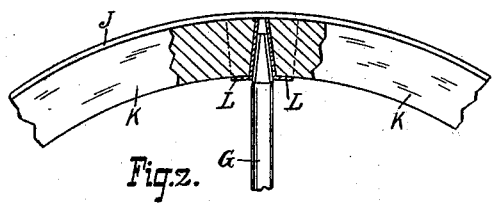

(No Model.)  2 Sheets—Sheet 1.
R. A. TOWNSEND.
VEHICLE WHEEL.

No. 364,872.  Patented June 14, 1887.

Attest
A. Edmunds
Carl Hayden

Inventor
Robert Albert Townsend
Munn & Co
Attorneys (No Model.) 2 Sheets—Sheet 2.

R. A. TOWNSEND.
VEHICLE WHEEL.

No. 364,872. Patented June 14, 1887.

Attest
A. Edmunds
Carl Hayden

Inventor
Robert Albert Townsend
Munn & Co
Attorneys

UNITED STATES PATENT OFFICE.

ROBERT ALBERT TOWNSEND, OF SIBI, BELOOCHISTAN, INDIA.

VEHICLE-WHEEL.

SPECIFICATION forming part of Letters Patent No. 364,872, dated June 14, 1887.

Application filed December 4, 1886. Serial No. 220,727. (No model.)

*To all whom it may concern:*

Be it known that I, ROBERT ALBERT TOWNSEND, a subject of the Queen of Great Britain, and a resident of Sibi, Beloochistan, India, have invented certain new and useful Improvements in Vehicle-Wheels, of which the following is a specification.

A great source of trouble with continuous tires on wooden wheels is the shrinkage of the timber, particularly when green, rendering cutting and resetting of the tires necessary. In common practice this shrinkage is taken up by removing the rim-tire, cutting a piece out of it, and welding it together again. This rim-tire is then expanded by heating, and when heated is placed around the circle of fellies or wooden rim, and the cooling of this rim-tire shrinks it upon the wooden rim to tightly compress the wheel.

The object of my invention is to dispense with this expensive and laborious method of tightening the rim-tire on the circle of fellies or wooden rim, and to instantly compress the spokes, circle of fellies or wooden rim, and rim-tire tightly together radially from the hub, to form a firm and perfect wheel without expense; and the further objects of my invention are at the same time to bridge over the space between the adjacent ends of the fellies that may be formed at that point by the shrinking of said fellies, and to tightly compress the circle of fellies forming the wooden rim lengthwise in the direction of the circumference of the wheel; and this invention consists of the application of an inclined plane at the hub to lengthen the radii of the wheel for the purpose of tightly compressing the radii or spokes, circle of fellies, and rim-tire radially from the hub; and it also consists of the following device for bridging and strengthening the gaps caused by the contraction of the fellies at their points of junction—namely, tire-jacks, which are operated by the spokes at the same time as the latter are moved outward, when the radii of the wheel is being increased, to bridge the space between the fellies caused by the shrinkage of the latter; and this tire-jack not only effects this result, but at the same time is compressed on the ends of the fellies to force them at the rim in the direction of the circumference of the wheel, so that by a very slight and simple adjustment the wheel is instantly compressed tightly together radially from the hub, as well as in the direction of its circumference at the circle of fellies or wooden rim.

The construction and operation will be more particularly described with reference to the accompanying drawings, wherein—

Figure 3:
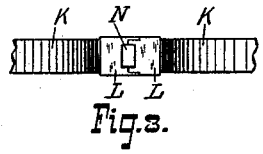
Figure 1:
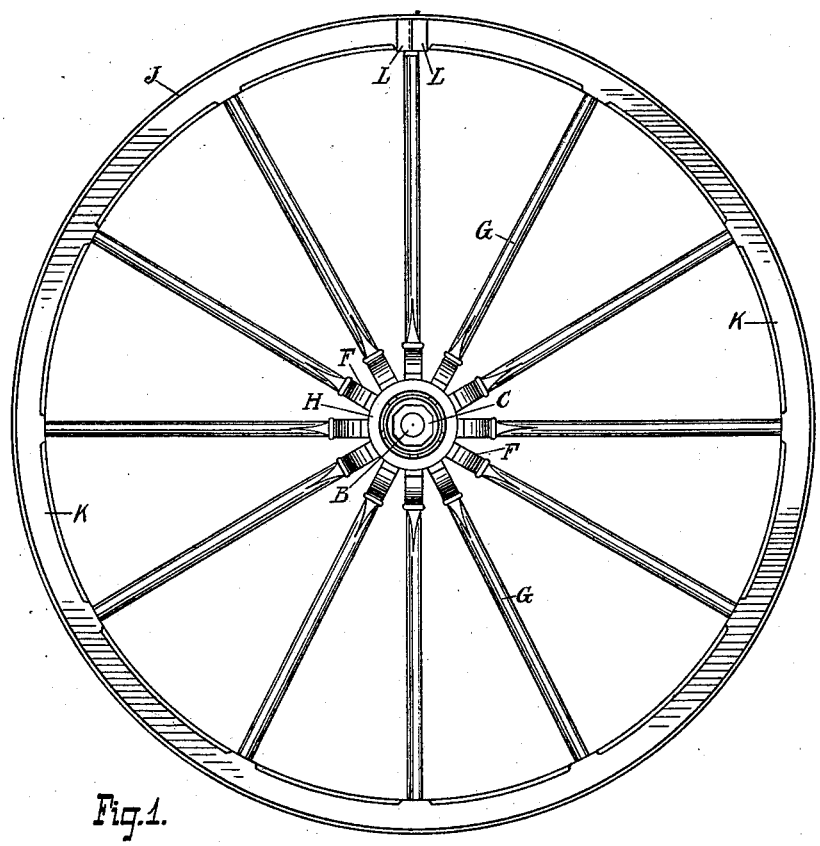
Figure 6:
Figure 7:
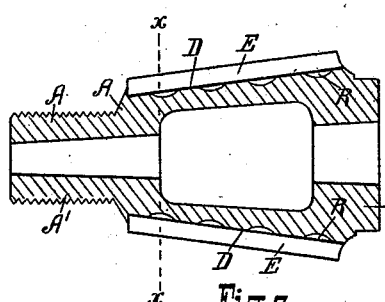
Figure 8:
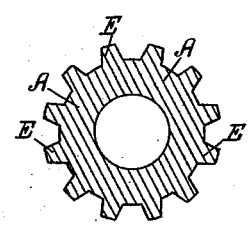
Figure 9:
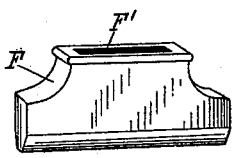
Figure 4:
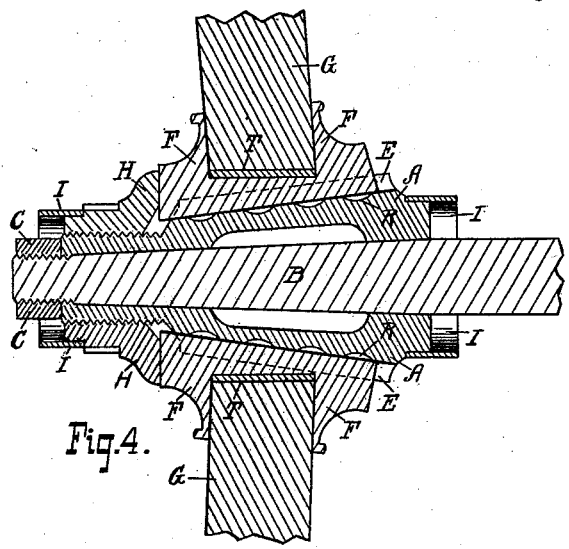
Figure 5:
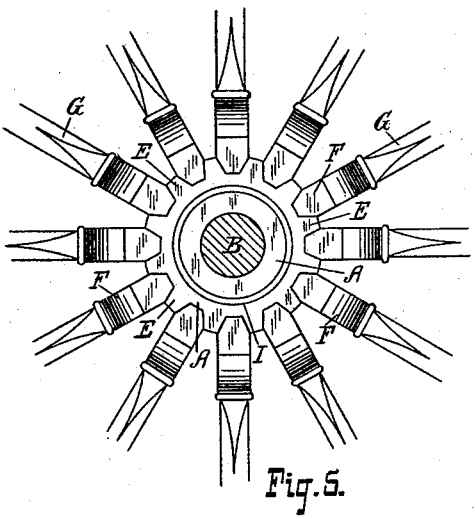

Figure 1 is a side elevation of a vehicle-wheel embodying my invention. Fig. 2 is an enlarged detail view of a segment of the rim of the wheel, partly in section. Fig. 3 is a plan view of the inner face of Fig. 2, with spoke removed. Fig. 4 is an enlarged detail longitudinal sectional view of the hub and connections. Fig. 5 is an end view of Fig. 4. Fig. 6 is an enlarged detail longitudinal sectional view of the hub collar-nut. Fig. 7 is a longitudinal sectional view of the hub. Fig. 8 is a sectional view on the line $x\,x$ of Fig. 7. Fig. 9 is an enlarged detail perspective view of the shoe or spoke-carrier.

A designates a hub revolving on the axle-arm B, and held thereon by nut C, and I I are sand-bands. (Shown particularly in Fig. 4 of accompanying drawings.) On the periphery of this hub A inclined planes D are formed, and ribs or flanges E are formed thereon.

F are independent shoes or spoke-sockets, (shown particularly in Fig. 9,) the base of which shoes are fitted to the face of the hub A and the space between the ribs or flanges E, and G are spokes fitted to sockets F' in the shoes F.

H is a collar-nut screwed on a reduced front portion, A', of the hub A.

J designates the rim-tire, K K the fellies forming the wooden rim, and L L the tire-jack. This tire-jack is formed in two pieces, L L, which are fitted to the adjacent ends of the fellies K K. These are shown particularly in Figs. 2 and 3, and the ends of such spokes G as fit into the tire-jacks L L are provided with tapered metallic thimbles, to increase the wearing capacity of the ends of said spokes; and as the spoke G is moved outward radially from the hub a portion of the tapered end of the spoke which is wider in cross-section is projected between the two pieces L L, forming said tire-jack. This firmly binds the tire-jack and the circle of fellies forming the wooden rim together lengthwise in the direction of the circumference of the wheel, and one piece, L, of this tire-jack laps over the other a sufficient distance, so that when they are moved apart to the widest possible distance, caused by the shrinkage of the wooden rim, no opening will show between the two pieces L L, forming said tire-jack.

In constructing this wheel the shoes into which the spokes are driven are placed in position on the hub and temporarily banded, after which the wooden rim or fellies are attached in the ordinary manner, and the length of the spokes G and shoes F is regulated so that when the wheel is new and the spokes fitted firmly therein one end of each of said shoes F will project over the reduced portion A' of the hub. H is a collar-nut, which is then screwed on this reduced portion A' of the hub (on which a screw-thread has been previously formed) until the inner side face of the collar-nut H abuts against the ends of the shoes F. Then by engaging a wrench or spanner with said collar-nut H said wrench or spanner readily takes a firm hold on said collar-nut, to screw it farther on the reduced portion A' of the hub A. This moves the shoes F, carrying the spokes, up the inclined plane D, thereby increasing their radial length, and thus compressing the spokes, circle of fellies forming the wooden rim, and rim-tire tightly together radially from the hub, and the portion of the tapered end of the spoke which is wider in cross-section is moved between the two pieces L L, forming the tire-jack, which binds them, as well as the fellies K K held therein, lengthwise in the direction of the circumference of the wheel, which compresses every part of the wheel firmly together; and an inclined plane may be formed on the lower side or base of the shoe F in the opposite direction to that formed on the hub A, so that a very slight turn of the collar-nut H will move the shoes F, together with the spokes G, up the inclined plane D of the hub A, thereby increasing their radial diameter and tightening the wheel very rapidly and effectually. The friction of the base of the shoe F moving on the inclined plane D may be reduced by forming grooves or recess R in said inclined plane D. The "dish" or inclination of the spokes outward may be regulated by the inclination given to the socket F' in the shoe F, which dish or inclination is permanently retained.

There are several modifications of the application of an inclined plane at the hub of the wheel, for the purpose herein set forth, which would suggest themselves to the skilled mechanic, such as forming the inclined plane alternately with the spokes from each end of the hub; but this would require two nut-collars and two reduced portions—one at each end of the hub—on which said nut-collars would have to be screwed to move the spoke-carriers up on said inclined planes; but no other method has been found preferable to the one herein shown and described.

A packing, T, of rubber or other suitable material, may be placed beneath the end of each spoke in the shoe-socket F', for the purpose of adapting the ends of the spokes in the sockets F' to any inequalities which may be formed therein, and thereby forming and always retaining a perfect wheel. This packing T also deadens the sound and prevents the wheel from rattling. It also facilitates the movement of the shoe up the inclined plane.

Having thus described my invention, what I claim as new, and desire to secure by Letters Patent, is—

1. In a vehicle-wheel, the combination of a hub having inclined planes on its outer surface, fellies having tapering sockets between their adjacent ends, spoke-shoes fitting on the inclined planes, spokes fitting in the shoes and the tapering sockets, and a nut screwed on the hub and engaging the spoke-shoes, substantially as herein shown and described.

2. In a vehicle-wheel, the combination of the hub A, provided with inclined planes D, the ribs E, and the reduced and screw-threaded end A', the socketed spoke-shoes F, resting on the inclined planes and projecting over the reduced end, and the nut H, substantially as herein shown and described.

3. In a vehicle-wheel, the combination of the hub A, having the reduced and screw-threaded end A' and provided with the inclined planes D, the ribs E, and the grooves R, the spoke-shoes F, provided with the sockets F', resting on the inclined planes and projecting over the reduced end, and the nut H, substantially as herein shown and described.

4. In a vehicle-wheel, the combination of a hub having inclined planes, spoke-shoes fitting on the inclined planes, and a nut on the end of the hub, of the fellies K K, the plates L L between the adjacent ends of the fellies, and forming a socket, and the spokes G, fitting in the shoes and provided with tapering outer ends fitting in the conical sockets, substantially as herein shown and described.

5. In a vehicle-wheel, the combination, with the fellies K K, of the overlapping plates L L, secured to the adjacent ends of the fellies, substantially as herein shown and described.

In testimony whereof I affix my signature in the presence of the two undersigned witnesses.

ROBERT ALBERT TOWNSEND.

Witnesses:
P. J. EDMUNDS,
A. EDMUNDS.